US007248638B1

(12) United States Patent
 Banister

(10) Patent No.: US 7,248,638 B1
(45) Date of Patent: Jul. 24, 2007

(54) TRANSMIT ANTENNA MULTI-MODE TRACKING

(75) Inventor: Brian C. Banister, San Diego, CA (US)

(73) Assignee: LSI Logic, Milpitas, CA (US)

( * ) Notice: Subject to any disclaimer, the term of this patent is extended or adjusted under 35 U.S.C. 154(b) by 631 days.

(21) Appl. No.: 10/198,303

(22) Filed: Jul. 17, 2002

Related U.S. Application Data

(63) Continuation-in-part of application No. 10/197,965, filed on Jul. 16, 2002, which is a continuation-in-part of application No. 10/080,728, filed on Feb. 22, 2002, which is a continuation-in-part of application No. 10/080,751, filed on Feb. 22, 2002, and a continuation-in-part of application No. 10/076,925, filed on Feb. 14, 2002, now Pat. No. 7,180,956.

(60) Provisional application No. 60/308,474, filed on Jul. 27, 2001, provisional application No. 60/346,130, filed on Oct. 29, 2001, provisional application No. 60/278,501, filed on Mar. 23, 2001.

(51) Int. Cl.
    *H04B 7/02* (2006.01)
    *H04B 7/08* (2006.01)
    *H04L 27/00* (2006.01)
    *H04L 1/02* (2006.01)

(52) U.S. Cl. ............... 375/267; 375/299; 375/347; 455/101; 455/132

(58) Field of Classification Search ............ 375/141, 375/144, 146, 147, 240.04, 267, 299, 358, 375/347, 130, 140, 148, 316, 295; 455/101, 455/102, 240.04, 132; 370/335, 342, 441
See application file for complete search history.

(56) References Cited

U.S. PATENT DOCUMENTS

| 5,517,686 | A * | 5/1996 | Kennedy et al. ............ 455/273 |
| 6,748,024 | B2 * | 6/2004 | Kuchi et al. ................ 375/299 |
| 6,831,943 | B1 * | 12/2004 | Dabak et al. ............... 375/147 |
| 6,907,270 | B1 * | 6/2005 | Blanz ...................... 455/562.1 |
| 6,952,455 | B1 * | 10/2005 | Banister .................... 375/267 |
| 2001/0053678 | A1 * | 12/2001 | Bonaccorso et al. ........ 455/137 |

OTHER PUBLICATIONS

Derek Gerlach and Arogywami Paulraj, "Adaptive Transmitting Antenna Arrays with Feedback," Oct. 199, IEEE Signal Processing Letters, vol. 1, No. 10.*
3GPP specification: "Advanced Closed loop TX Diversity Concept (eignbeamforming)," 3GPP TSG RAN WG 1, Jul. 4-7, 2000, 1-12.*
3GPP specification, "Closed Loop mode Transmit Diversity," 3GPP TS 25-214 V5.2 Draft (Sep. 2002), pp. 43-51*

(Continued)

*Primary Examiner*—Tesfaldet Bocure
(74) *Attorney, Agent, or Firm*—Kirkpatrick & Lockhart Preston Gates Ellis

(57) ABSTRACT

Provided are methods and apparatuses for use in wireless communication between a transmitter having plural transmit antennas and a receiver having plural receive antennas. A first data stream using a first transmit antenna weight vector and a second data stream using a second transmit antenna weight vector simultaneously are transmitted to the receiver. In addition, a first perturbation signal corresponding to the first transmit antenna weight vector and a second perturbation signal corresponding to the second transmit antenna weight vector are transmitted. Feedback regarding the first transmit antenna weight vector and the second transmit antenna weight vector is received from the receiver and is utilized to modify the first transmit antenna weight vector and the second transmit antenna weight vector.

24 Claims, 5 Drawing Sheets

OTHER PUBLICATIONS

Derryberry, et al. (Nokia), "Transmit Adaptive Arrays without User Specific Pilot", Aug. 1999.

Banister, et al., "A Stochastic Gradient Algorithm for Transmit Antenna Weight Adaptation with Feedback", Workshop on Signal Processing Advances in Wireless Communications, Mar. 2001.

Banister, et al., "Tracking Performance of a Stochastic Gradient Algorithm for Transmit Antenna Weight Adaptation with Feedback", International Conference on Acoustics, Speech and Signal Processing, May 2001.

Harrison (Motorola), "TX AA Parameter Recommendations", Sep. 1999.

Harrison, et al. (Motorola), "Open and Closed Loop Transmit Diversity at High Data Rates on 2 and 4 Elements", Aug. 1999.

Liang, et al., "Forward Link Antenna Diversity Using Feedback for Indoor Communication Systems", Proceedings of International Conference on Acoustics, Speech and Signal Processing, May 1995, pp. 1753-1755.

Liang, et al., "Transmit Antenna Array Techniques for Cellular CDMA Systems", Proceedings of the Ninth International Symposium on Personal, Indoor, and Mobile Radio Communications, Sep. 1998, pp. 1396-1400.

Rashid-Farrokhi, et al., "Transmit Beamforming and Power Control for Cellular Wireless Systems", IEEE Journal on Selected Areas in Communications, vol. 16, No. 8, Oct. 1998.

Alamouti, "A Simple Transmit Diversity Technique for Wireless Communications", IEEE Journal on Select Areas in Communications, vol. 16, No. 8, Oct. 1998.

G. Foschini, "Layered Space-Time Architecture for Wireless Communication in a Fading Environment When Using Multi-Element Antennas", Bell Labs Technical Journal, Autumn 1996.

Foschini, et al., "On Limits of Wireless Communications in a Fading Environment when Using Multiple Antennas", Wireless Personal Communications, vol. 6, 1998, pp. 311-335.

Tarokh, et al., "Space-Time Block Coding for Wireless Communications: Performance Results", IEEE Journal on Selected Areas in Communications, vol. 17, No. 3, Mar. 1999, pp. 451-460.

E. Telatar, "Capacity of Multi-Antenna Gaussian Channels", European Transactions on Telecommunications, vol. 10, No. 6, Nov. 1999, pp. 585-595.

Bliss, et al., "MIMO Environmental Capacity Sensitivity", Proceedings of the 34th Asilomar Conference on Signals, Systems and Computers, Oct. 2000.

\* cited by examiner

TRANSMIT ANTENNA MULTI-MODE TRACKING

This is a continuation-in-part of the following commonly assigned U.S. patent applications: (i) Ser. No. 10/076,925, filed Feb. 14, 2002 (the '925 Application) now issued as U.S. Pat. No. 7,180,956 on Feb. 20, 2007; (ii) Ser. No. 10/080,751 filed on Feb. 22, 2002 (the '751 Application) still pending; (iii) Ser. No. 10/080,728 filed on Feb. 22, 2002 (the '728 Application) still pending; and (iv) "Multiple Transmit Antenna Weighting Techniques" filed on Jul. 16, 2002 (Ser. No. 10/197,965), which in turn claim priority to U.S. Provisional Patent Application Ser. Nos. 60/278,501 filed on Mar. 23, 2001, and 60/308,474 filed on Jul. 27, 2001, and to the commonly assigned U.S. Provisional Patent Application Ser. No. 60/346,130 titled "Method and System for Perturbation Pilot for Gradient Feedback Transmit Antenna Array Adaptation" filed on Oct. 29, 2001. Each of the foregoing applications is incorporated by reference herein as though set forth herein in full.

BACKGROUND OF THE INVENTION

1. Field of the Invention

The present invention concerns wireless communications, such as cellular-based wireless communications, and is particularly directed to systems that use multiple transmit antennas and multiple receive antennas.

2. Description of the Related Art

Recently, certain work has been done in an attempt to increase the capacity of a wireless link between a transmitter and a receiver by using multiple transmit and/or multiple receive antennas. Generally speaking, this conventional work focuses on the identification of a set of transmit antenna weights that can be used in more efficiently deliver a signal from the transmitter to the receiver. While such efforts have been somewhat successful, additional improvements are desirable.

SUMMARY OF THE INVENTION

The present invention addresses this need by providing techniques that can be used to facilitate multi-mode tracking between a transmitter and a receiver, thereby allowing plural data streams to be broadcast simultaneously between a transmitter and a receiver, each such data stream being transmitted using a different transmit antenna weight vector.

Thus, in one aspect the invention is directed to wireless communication between a transmitter having plural transmit antennas and a receiver having plural receive antennas. A first data stream using a first transmit antenna weight vector and a second data stream using a second transmit antenna weight vector simultaneously are transmitted to the receiver. In addition, a first perturbation signal corresponding to the first transmit antenna weight vector and a second perturbation signal corresponding to the second transmit antenna weight vector are transmitted to the receiver. Feedback regarding the first transmit antenna weight vector and the second transmit antenna weight vector is received from the receiver and is utilized to modify the first transmit antenna weight vector and the second transmit antenna weight vector.

In a further aspect, the invention is directed to wireless communication between a transmitter having plural transmit antennas and a receiver having plural receive antennas. Plural input signals are received, one input signal from each receive antenna. From each input signal, plural pilot signals are decoded, one pilot signal corresponding to each of plural data stream signals. A modified channel gain matrix is estimated based on the decoded pilot signals, the modified channel gain matrix reflecting actual channel gains between the transmitter and the receiver and any antenna weightings applied by the transmitter. The modified channel gain matrix is then used to obtain the plural data stream signals.

In a still further aspect, the invention is directed to wireless communication between a transmitter having plural transmit antennas and a receiver having plural receive antennas. Plural input signals are received, one input signal from each receive antenna. From each input signal, plural pilot signals are decoded, one pilot signal corresponding to each of the plural transmit antennas at the transmitter. A channel gain matrix is estimated based on the decoded pilot signals, the channel gain matrix reflecting channel gains between the transmitter and the receiver. A set of transmit antenna weight vectors for simultaneously transmitting plural data stream signals is selected based on the channel gain matrix, and information to identify the set of transmit antenna weight vector is transmitted to the transmitter.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
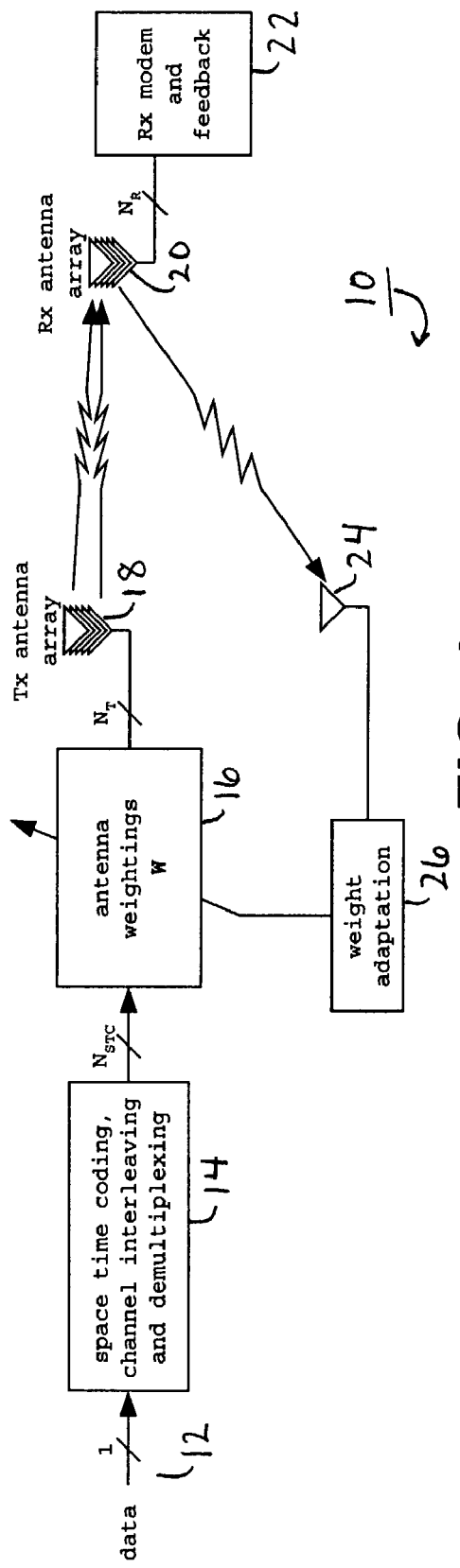
FIG. 1 is a high-level block diagram illustrating a wireless communication system according to a preferred embodiment of the present invention.

This disclosure is related to commonly assigned U.S. patent application Ser. No. 09/632,081 filed on Aug. 2, 2000 (the '081 Application), which application is incorporated by reference herein as though set forth herein in full.

1. Nomenclature

| | |
|---|---|
| AA | adaptive antenna, more generally adaptive antenna algorithm |
| BS | base station, fixed station that communicates with multiple mobile stations and providing their gateway to the fixed network. |
| CDMA | code division multiple access |
| DS-CDMA | direct sequence CDMA |
| forward link | radio link from the transmitting base station to the receiving mobile station |
| HW | hardware, referring to the fixed digital logic portion of a modem as opposed to SW |

-continued

| | |
|---|---|
| MIMO | multiple input multiple output |
| MS | mobile station; typically, a user of a cellular wireless network, e.g., a cell phone or a wireless data terminal |
| pilot | a known signal or "training sequence" transmitted so that the receiver may use it to estimate the channel response. |
| receive unit | the unit that is receiving the signals that are sent according to the transmit weight adaptation algorithm, generally referred to as the mobile station. This unit is also actively transmitting, as, at a minimum, the feedback information must be transmitted to the "transmit" unit, and usually there is other reverse traffic and signaling. |
| reverse link | radio link from the transmitting mobile station to the receiving base station |
| Rx | receive |
| SISO | single-input single-output |
| STC | space time coding |
| SW | software, typically to distinguish the (modifiable) SW portion of a modem from the HW |
| transmit unit | the unit that is transmitting the signals that are sent according to the transmit weight adaptation algorithm, generally referred to as the base station. This unit is also actively receiving, as at a minimum the feedback information must be received from the "receive" unit, and usually there is other reverse traffic and signaling. |
| Tx | transmit |
| $\|\cdot\|$ | matrix or vector norm, typically 2-norm if not otherwise specified. For a vector x, the 2-norm is $\|x\|_2 = \sqrt{x^H x}$. For a matrix A, the two norm is $$\|A\|_2 \equiv \sqrt{\max_{x,\|x\|_2=1} (x^H A^H A x)}$$ |
| $\|\cdot\|_{Fr}$ | matrix or vector Frobenius norm, typically 2-norm if not otherwise specified. For a matrix A, the Frobenius norm is $$\|A\|_{Fr} \equiv \sqrt{\sum_{i,j} |a_{i,j}|^2}$$ |
| $\|\cdot\|$ | scalar absolute value or matrix determinant |
| $(.)^H$ | matrix or vector hermitian (complex conjugate transpose) |

2. Introduction

The present invention allows for an increase of the transmission capacity of a digital wireless network, increasing the data rates which can be transmitted across the channel. The invention provides a specific technique of "multi-mode tracking" (frequently called "subspace tracking"), tracking the independent modes of the MIMO transfer function. The specific algorithm presented is a multi-mode variation of the algorithm originally disclosed in the '081 Application. All of the additions and variations on that disclosure described in the '925, '751 and '728 Applications can in principle be applied to this invention.

In recent years there have been advances in MIMO communications systems, specifically the concept of "space time coding" for wireless communications. The STC algorithms use the independent modes of the MIMO transfer function to effectively attain multiple parallel data pipes. For example, with $N_T$ transmit and $N_R$ receive antennas, there can in general be $\min(N_T, N_R)$ independent modes (separable channels) from the transmitting system to the receiving system, which allows for a factor of $\min(N_T, N_R)$ increase in the effective available transmission bandwidth. This allows for greater transmission bit rates. The optimal transmission algorithm uses a "water filling" power/rate allocation strategy into these non-zero modes, but the complexity of this is prohibitive. Only the receiving unit can measure the channel, and therefore feedback is required to give this information to the transmitting unit.

The present invention defines an algorithm for tracking the non-zero modes of the transfer function utilizing feedback, but without the additional complexity of doing the optimal power/rate allocation into those modes. This can provide benefit when the number of transmit antennas exceeds the number of receive antennas. The specific algorithm proposed is a multi-mode variation on the algorithm originally disclosed in the '081 Application. It should be pointed out that the algorithm of the '081 Application is in some sense a subset of the algorithm described in the present invention, where the number of receive antennas is one, and hence the number of tracked modes is one.

FIG. 1 illustrates a high-level block diagram of a system 10 according to the present invention. In system 10, a stream of digital traffic signal data 12 is processed 14 to perform space-time coding, channel interleaving and demultiplexing, resulting in $N_{STC}$ separate data channels. Antenna weights are then applied 16 to convert these $N_{STC}$ channels (channel multiplexed together with $N_{STC}$ pilot signals, described in more detail below) into $N_T$ signals. These $N_T$ signals, in turn, are provided to the corresponding $N_T$ transmit antennas in antenna array 18.

At the receiver side, $N_R$ antennas 20 receive $N_R$ corresponding signals. From these $N_R$ signals, each including $N_{STC}$ pilot signals, the $N_{STC}$ data signals are decoded and a feedback signal is generated 22, the feedback signal indicating how the transmitter should modify the transmit antenna weights in order to appropriately track the $N_{STC}$ transmit modes. This feedback signal is then transmitted to receive antenna 24 (on the transmitter side) and is in fact used to modify 26 the antenna wights for use in the next transmit interval. As a result of this arrangement, multiple independent modes between a single transmitter and a single receiver can be tracked and used to simultaneously transmit multiple data signals. The foregoing processing is described in more detail below.

The focus of this invention is the signal processing approach to tracking the transfer function modes, and not the coding techniques applied once those modes are determined. Any of a number of standard coding techniques can be applied in this situation, as the MIMO transfer function modes can be utilized the same as any time/frequency modes are used for coding. There is a substantial body of existing prior art on the subject of signal processing approaches for adaptation in non-MIMO environments, both academic and industrial.

3. Theoretic Background

It is worthwhile to consider the principle of information theoretic channel capacity and its application to MIMO systems. Consider first a single-input single-output (SISO) complex additive white Gaussian noise channel. That is:

$$y = hx + n \qquad \text{Eq. 1}$$

where x is the input modulation sequence, h is the complex gain of the channel, n is a zero mean complex Gaussian random variable with variance $2\sigma^2$, and y is the sequence received by the receiver. Time indices are omitted, and capacity is considered in terms of bits per ues of the channel, that is the average number of information bits received and correctly decoded at the receiver for each realization of Eq. 1. This capacity is found with the mean power of x constrained to some transmit power $P^{(T)}$. Then the capacity, C, is given by:

$$C = \log_2\left(1 + \frac{|h|^2 P^{(T)}}{2\sigma^2}\right) \qquad \text{Eq. 2}$$

where the units of C are bits per channel use.

Now consider the complex MIMO case. In this case, the channel input is a $N_T \times 1$ vector x, the output is the $N_R \times 1$ vector y, the channel gain is a $N_R \times N_T$ matrix H, and the noise is a zero mean $N_R \times 1$ complex Gaussian vector n with correlation $2\sigma^2 I$. The power constraint on the transmitted sequence becomes $E(x^H x) = P^{(T)}$ and:

$$y = Hx + n \qquad \text{Eq. 3}$$

The choice of the nature of x now becomes important. The transmit power constraint $P^{(T)}$ is maintained. If the transmitter has knowledge of the value of H, then this can be used to advantage. If this is not known ("blind" space-time coding), then the optimum strategy is to transmit x as a zero mean uncorrelated Gaussian vector, and it is straightforward to show that:

$$C_{blind} = \log_2\left(\left|I + \frac{P^{(T)}}{2N_T \sigma^2} H^H H\right|\right) \qquad \text{Eq. 4}$$

where |·| denotes the matrix determinant and $()^H$ denotes the hermitian transpose (or conjugate transpose).

To prove this and to illustrate the existence and use of parallel "channels" in several eigenmodes, we need to make use of the singular value decomposition (SVD). The SVD decomposes H into orthogonal matrices U and V as well as a diagonal matrix $\Lambda^{1/2}$, which contains at most $N_{min} = \min(N_T, N_R)$ non-zero, real, positive entries, $\lambda_0^{1/2}, \lambda_1^{1/2}, \ldots, \lambda_{Nmin-1}^{1/2}$. These values are sorted, so that $\lambda_k \leq \lambda_{k-1}$. The problem has a matrix rank given by $N_{min}$.

$$\underset{N_R \times N_T}{H} = \underset{N_R \times N_R}{U} \underset{N_R \times N_T}{\Lambda^{1/2}} \underset{N_T \times N_T}{V^H} \qquad \text{Eq. 5}$$

$$U^H U = I \qquad \text{Eq. 6}$$

$$V^H V = I \qquad \text{Eq. 7}$$

Then the channel formulation of Eq. 3 can be recast into an equivalent format with $\tilde{y}$, $\tilde{x}$ and $\tilde{n}$.

$$\tilde{y} = U^H y \qquad \text{Eq. 8}$$
$$= \Lambda^{1/2} V^H x + U^H n$$
$$= \Lambda^{1/2} \tilde{x} + \tilde{n}$$

Because V is an orthogonal matrix and x is uncorrelated, $\tilde{x}$ has the same statistics as x, $$E(xx^H) = E(\tilde{x}\tilde{x}^H) = \frac{P^{(T)}}{N_T} I.$$

The same applies to the Gaussian noise term n.

Considering Eq. 8, it is seen that this result is $N_{min}$ independent realizations of the SISO system described by Eq. 1. Hence, the capacity is:

$$C_{blind} = \sum_{k=0}^{N_{min}-1} \log_2\left(1 + \frac{P^{(T)}}{2N_T \sigma^2} \lambda_k\right) \qquad \text{Eq. 9}$$
$$= \log_2\left(\prod_{k=0}^{\min(N_T, N_R)} \left(1 + \frac{P^{(T)}}{2N_T \sigma^2} \lambda_k\right)\right)$$
$$= \log_2\left(\left|I + \frac{P^{(T)}}{2N_T \sigma^2} H^H H\right|\right)$$

Let the $N_T \times N_T$ squared gain matrix be R $$R = H^H H \qquad \text{Eq. 10}$$

and the eigendecomposition of R be given by:

$$R = V \Lambda V^H \qquad \text{Eq. 11}$$

where the orthogonal matrix V is comprised of the eigenvectors of R and the $N_T \times N_T$ diagonal matrix $\Lambda$ is $\Lambda^{H/2} \Lambda^{1/2}$, comprising of the eigenvalues $\lambda_k$ of R. Then, the independent components of Eq. 8 are seen to correspond to the eigenmodes of R, or the independent modes of the channel. These are the parallel "channels" which are made available through the space-time coding techniques in the MIMO environment and which allow for capacity increases over non-MIMO systems.

An "informed" transmitter, which knows the realization of H, can attain better performance than that described above. The optimal system would use "water filling" in each of the eigenmodes. This technique allocates the transmit power to each of the modes according to the gain of that mode (given by $\lambda_k$), with larger transmitted power and higher data rates for the modes with higher gains. Those modes with zero gain receive zero power, since no power transmitted into those modes will reach the receiver.

If we consider Eq. 8 and Eq. 9, it becomes apparent that when $N_T > N_R$ some of the transmitted power is completely wasted. Because the rank of R is the minimum of $N_R$ and $N_T$, there are null spaces in R, and the transmitter is transmitting power into those null spaces. This means that the transmitter is transmitting power that cannot reach the receiver, and thus is wasted. If the transmitter can just track the non-zero modes, then the power efficiency is improved, even without attaining the optimal "water filling" situation. That is, the objective of the transmitter becomes to use a correlated modulation vector x wherein:

$$E(xx^H) = \frac{P^{(T)}}{\sum_{k=0}^{N_T-1}(\lambda_{N_T-1} > 0)} V \begin{bmatrix} (\lambda_0 > 0) & & \\ & (\lambda_1 > 0) & \\ & & (\lambda_{N_T-1} > 0) \end{bmatrix} V^H \qquad \text{Eq. 12}$$

Here, the term $(\lambda_k > 0)$ represents the numerical value of the Boolean, 0 if not true, and 1 if true. Using this correlation matrix on x, the transmitter transmits power only into those modes which have a non-zero gain to the receiver, and hence which deliver usable power to the receiver.

Applying Eq. 8 and Eq. 9 in connection with this modified modulation scheme, with $N_T > N_R$, we find:

$$C_{mode\ tracking} = \log_2\left(\left|1 + \frac{P^{(T)}}{2N_R\sigma^2}H^H H\right|\right) \quad \text{Eq. 13}$$

Hence, we find that when the number of receive antennas is less than the number of transmit antennas, we can obtain a capacity improvement of $N_T/N_R$ from this multi-mode tracking implementation. One object of the present invention is a specific algorithm to accomplish this multi-mode tracking. In practice, one implementation would be to assume that $N_R$ modes are non-zero, and transmit into that many modes according to some multi-mode tracking algorithm which would attempt to track those $N_R$ modes. Note that this technique only provides improvement if the number of transmit antennas exceeds the number of receive antennas. This situation is deemed to be reasonable since it can be desirable, both from size and cost constraints, to place more antennas on the network infrastructure than on the mobile terminals.

In addition to the above-described situation, environmental conditions may not provide even $\min(N_T, N_R)$ independent modes (or channels), because the matrix H may not be of maximal rank. This will become increasingly likely as one tries to maximize the number of modes by increasing the number of receive and transmit antennas, as the environment will only provide so much randomization of H. Hence, there may be a number smaller than $\min(N_T, N_R)$ which would be the desired number of modes to exercise, and the present invention attempts to track those modes.

4. Implementation 4.1. Definitions and Setup

We begin by defining the following terms:

| | |
|---|---|
| $F_{pre}(.)$ | pre-measurement function, performing some degree of orthonormalization, returning a matrix of same dimension as the input. This function can be different for different implementations. |
| $F_{post}(.)$ | post-feedback function, performing some degree of orthonormalization, returning a matrix of same dimension as the input. This should "complete" any orthonormalization left incomplete by $F_{pre}$ |
| $N_{col}(.)$ | column normalization function, returning column-normalized modification of input matrix; see equation Eq. 14. |
| $Q(.)$ | function returning orthonormal basis column vectors of the input matrix column vectors, i.e., the matrix Q of a QR decomposition. An example is the orthonormal basis set arising from Gramm-Schmidt orthogonalization. |
| i | time index, at the Nyquist rate |
| $N_T$ | number of transmit antennas ($N_T > N_R$) |
| $N_R$ | number of receive antennas ($N_T > N_R$) |
| $N_{STC}$ | number of space-time coding transmission modes, i.e., the number of coded parallel transmissions |
| $M_{slot}$ | duration of the pilot even/odd banking slot, units are in increments of i |
| $M_{meas}$ | number of slots between measurement and weight updates |
| $t(i)$ | $N_T \times 1$ transmitted vector |
| $r(i)$ | $N_R \times 1$ received vector |
| $s_{traffic}(i)$ | $N_{STC} \times 1$ vector of the channel-coded symbols, transmitted at time i |
| $s_{pilot}(i)$ | $N_{STC} \times 1$ vector of the dedicated pilot signal, transmitted at time i |
| $P^{(T)}_{traffic}$ | total mean transmitted power of the traffic channel (summed over all antennas) |
| $P^{(T)}_{pilot}$ | total mean transmitted power of pilot channel (summed over all antennas) |
| $H(i)$ | $N_R \times N_T$ matrix, specifying the forward channel complex gain from each Tx antenna to each Rx antenna |
| $W_{base}(i)$ | $N_T \times N_{STC}$ vector, "base" tracked antenna complex weights from which all other weights are calculated in the perturbation gradient tracking approach. |
| $W_{traffic}(i)$ | $N_T \times N_{STC}$ vector, antenna complex weights for data channel |
| $W_{pilot}(i)$ | $N_T \times N_{STC}$ vector, antenna complex weights for pilot channel. In the gradient operation, this is instantaneously equal to either $W_{even}(i)$ or $W_{odd}(i)$. |
| $W_{even}(i)$ | $N_T \times N_{STC}$ vector, antenna complex weights, even pilot channel |
| $W_{odd}(i)$ | $N_T \times N_{STC}$ vector, antenna complex weights, odd pilot channel |
| $P(i)$ | $N_T \times N_{STC}$, test perturbation to the complex weights, preferably generated as a complex Gaussian |
| $\beta$ | algorithm parameter, adaptation rate |

The column normalization function on a matrix A is introduced as $F(\ )$.

$$N_{col}\left(\underset{n \times m}{A}\right) = \left[\frac{a_0}{\|a_0\|}\ \frac{a_1}{\|a_1\|}\ \cdots\ \frac{a_{m-1}}{\|a_{m-1}\|}\right] \quad \text{Eq. 14}$$

Note that the nomenclature varies somewhat from the nomenclature of the previous related disclosures incorporated by reference herein. The channel gain is a matrix H rather than a vector c, and is portrayed as transposed from the previous use of c. Many of the matrices and vectors have their element dimension explicitly included in the presentation for additional clarity. This is displayed below the matrix, number of rows followed by number of columns. "Orthogonal matrix" describes a matrix with mutually orthogonal and unit 2-norm columns, although the term "unitary matrix" is often used when such a matrix is complex (as is the case here).

The system described will show signals and operation for transmission to one receive unit (with multiple antennas). Several such processes, to several receivers, generally will be occurring simultaneously.

The constraints operating on these parameters for self consistency (constraints on magnitudes are not constraints of the present invention, but merely arbitrary normalizations to ensure that the transmit powers, $P^{(T)}_{pilot}$ and $P^{(T)}_{traffic}$, are self-consistent) are:

orthonormal transmission weights.

$$\underset{N_{STC} \times N_T}{W^H}\ \underset{N_T \times N_{STC}}{W} = \underset{N_{STC} \times N_T}{W^H_{pilot}}\ \underset{N_T \times N_{STC}}{W_{pilot}} = \quad \text{Eq. 15}$$

$$\underset{N_{STC} \times N_T}{W^H_{even}}\ \underset{N_T \times N_{STC}}{W_{even}} = \underset{N_{STC} \times N_T}{W^H_{odd}}\ \underset{N_T \times N_{STC}}{W_{odd}} = \underset{N_{STC} \times N_{STC}}{I}$$

channel-coded symbols are uncorrelated (this arises from coding theory, and is essentially true of all codes with random information input) with total mean power of unity $$E(s_{traffic} s^H_{traffic}) = \frac{1}{N_{STC}} I \quad \text{Eq. 16}$$

pilot symbols are uncorrelated (in order for them to be separable at the receiver) with unit total mean power, as generally will be attained by application of orthogonal or quasi-orthogonal pilot channelization, with distinct pilot channels on each transmit antenna.

$$E(s_{pilot} s_{pilot}^H) = \frac{1}{N_{STC}} I \qquad \text{Eq. 17}$$

The algorithm will attempt to track the weights so that the column span of W is the same as the row span of H, which means that W occupies the sub-space defined by the nonzero eigenmodes described in section 3. By setting the weights applied to the various antennas to be orthonormal (e.g., Eq. 15) we are assured that the transmitter is transmitting equal power into all of the modes of the column span of W; this condition must be met by at least $W_{base}$, and approximately met by the other weight matrices. In addition, if the eigenvalues of R are nearly equal to each other, then orthogonal transmission will approximately provide orthogonal reception, which simplifies the receiver.

The transmission can then be described as:

$$\underset{N_T \times 1}{t}(i) = \sqrt{P_{traffic}^{(T)}} \underset{N_T \times N_{STC}}{W_{traffic}}(i) \underset{N_{STC} \times 1}{s_{traffic}}(i) + \sqrt{P_{pilot}^{(T)}} \underset{N_T \times N_{STC}}{W_{pilot}}(i) \underset{N_{STC} \times 1}{s_{pilot}}(i) \qquad \text{Eq. 18}$$

The received vector is then:

$$\underset{N_R \times 1}{r}(i) = \underset{N_R \times N_T}{H} \underset{N_T \times 1}{t}(i) \qquad \text{Eq. 19}$$

$$= \sqrt{P_{traffic}^{(T)}} \underset{N_R + N_T}{H} \underset{N_T \times N_{STC}}{W_{traffic}}(i) \underset{N_{STC} \times 1}{s_{traffic}}(i) +$$

$$\sqrt{P_{pilot}^{(T)}} \underset{N_R \times N_T}{H} \underset{N_T \times N_{STC}}{W_{pilot}}(i) \underset{N_{STC} \times 1}{s_{pilot}}(i)$$

$$= \sqrt{P_{traffic}^{(T)}} \underset{N_R \times N_{STC}}{\tilde{H}_{traffic}}(i) \underset{N_{STC} \times 1}{s_{traffic}}(i) +$$

$$\sqrt{P_{pilot}^{(T)}} \underset{N_R \times N_{STC}}{\tilde{H}_{pilot}}(i) \underset{N_{STC} \times 1}{s_{pilot}}(i)$$

where $\tilde{H}$ represents the composite channel as seen by the receiver. This is the channel that the receiver can measure, as it has no direct means of separating the contributions of the physical channel and the applied weights.

4.2. General Technique

The desired property of the antenna weights for multi-mode tracking is:

$$\underset{N_T \times N_T}{V^H} \underset{N_T \times N_{STC}}{W}(i) \cong \begin{bmatrix} \underset{N_{STC} \times N_T}{V_{0:N_{STC}-1, 0 \cdot N_T - 1}^H W_{N_T \times N_{STC}}}(i) \\ \underset{(N_T - N_{STC}) \times N_T}{0} \end{bmatrix} \qquad \text{Eq. 20}$$

Recalling that the eigenvectors and eigenvalues of Eq. 5 and Eq. 11 were sorted according to magnitude, Eq. 20 says that only those modes with the maximum gains are transmitted into by this set of weight vectors, because the $(N_T - N_{STC}) \times N_T$ zero matrix indicates no response in the eigenspaces with minimum gain. This guarantees that all of the transmitted power will reach the receiver.

The condition of Eq. 20 is attained by maximizing the total received power, subject to the orthogonal transmission constraint of Eq. 15. That is, any algorithm should use the pilot channel (although algorithms could be developed to also, or instead, use the traffic channel) to attempt to find:

$$W = \arg\left(\max_{W, W^H W = 1} \left(E(r_{pilot}^H(i) r_{pilot}(i))\right)\right) \qquad \text{Eq. 21}$$

$$= \arg\left(\max_{W, W^H W = 1} \left(tr(\tilde{H}_{pilot}^H \tilde{H}_{pilot})\right)\right)$$

$$= \arg\left(\max_{W, W^H W = 1} \left(tr(W_{pilot}^H H^H H W_{pilot})\right)\right)$$

So, the algorithm operates the maximize $tr(\tilde{H}_{pilot}^H \tilde{H}_{pilot}) = \|\tilde{H}_{pilot}\|_{Fr}$, where $\tilde{H}_{pilot}$ is the channel gain matrix measured by the receiver, specifying the gain of each space time code stream to each receive unit antenna.

Figure 2:
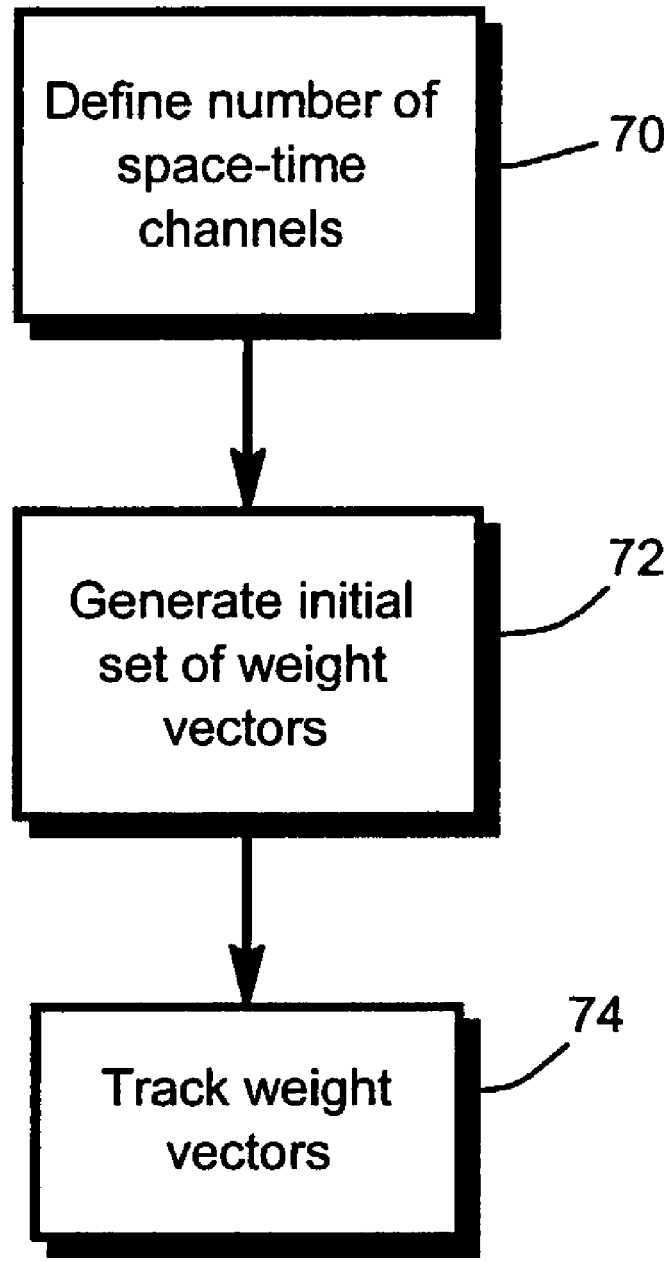
FIG. 2 is a flow diagram illustrating a general overview of transmitter-side processing according to a preferred embodiment of the present invention.

An implementation of the present invention is now described with reference to the flow diagram shown in FIG. 2.

Step 70: define the number of space time channels to be exercised, $N_{STC}$, with $N_{STC} \leq N_R$ (where $N_T > N_{STC}$), through negotiation between the transmit and receive units. Measurements at the receive unit may be used if there is a reasonable probability of having the number of useful modes be less than the number of receive antennas. Otherwise, $N_{STC}$ can be simply set to $N_R$.

Step 72: generate orthonormal multi-antenna weight vectors W, which translate the $N_{STC}$ code streams to $N_T$ antenna transmissions.

Step 74: track the weight vectors W through a mode-tracking algorithm, incorporating feedback from the mobile unit, in an attempt to track towards the condition described in Eq. 20, which maximizes Eq. 21 subject to Eq. 15.

Techniques for performing such tracking, according to the preferred embodiments of the invention, are described below.

4.2.1. Enhanced Eigenmode Separation

It can be desirable for the adaptation to be able to distinguish between the eigenmodes, so that the result of Eq. 20 is made to be diagonal. This provides that the vector received by the receiver is orthogonal, just as that transmitted by the transmitter is orthogonal according to Eq. 15. That is, the relationship of the weight vectors to the channel matrix would be:

$$\underset{N_T \times N_T}{V^H} \underset{N_T \times N_{STC}}{\tilde{W}}(i) \cong \begin{bmatrix} \begin{bmatrix} v_0^H \tilde{w}_0(i) & 0 & \cdots & 0 \\ 0 & v_1^H \tilde{w}_1(i) & & 0 \\ \vdots & \vdots & \ddots & \vdots \\ 0 & 0 & \cdots & v_{N_{STC}-1}^H \tilde{w}_{N_{STC}-1}(i) \end{bmatrix} \\ \underset{N_{STC} \times N_{STC}}{} \\ \underset{(N_T - N_{STC}) \times N_T}{0} \end{bmatrix} \qquad \text{Eq. 22}$$

where $v_k$ and $w_k$ are the columns of V and W respectively, and the tilde "~" simply denotes some arbitrary reordering of the columns of W; that is, it is desirable that the inner product of any of the weight vectors is zero with all but one of the eigenvectors. Given that V and W are both orthonormal, this means that W is V with appropriately reordered columns. That is, from Eq. 22:

$$\tilde{W}_{N_T \times N_{STC}}(i) = \frac{V_{0:N_T-1, 0:N_{STC}-1}}{N_T \times N_{STC}}$$ Eq. 23

This individual mode tracking provides orthogonality at the receiver; that is, each code stream of $s_{traffic}$ is received across the antennas orthogonal to all other code streams, making receiver processing easier. The orthogonality of the received code streams is seen in Eq. 24, where the tilde represents the same permutation pattern as in Eq. 22.

$$r_{traffic}(i) = \sqrt{P_{traffic}^{(T)}} \underset{N_R \times N_R}{U} \underset{N_R \times N_T}{\Lambda^{1/2}} \underset{N_T \times N_T}{V^H} \underset{N_T \times N_{STC}}{\tilde{V}} \underset{N_{STC} \times 1}{\tilde{s}_{traffic}}(i)$$ Eq. 24

$$= \sqrt{P_{traffic}^{(T)}} \underset{N_R \times N_R}{U} \underset{N_R \times N_T}{\Lambda^{1/2}} \underset{N_{STC} \times 1}{\tilde{s}_{traffic}}(i)$$

Note that when the $\lambda_k$'s are equal, there is no need for individual mode tracking, because the orthogonal vectors of V become arbitrary within the subspace of equal eigenvalues. Hence, any set of weight vectors W satisfying Eq. 20 would also satisfy Eq. 22 with the appropriate selection of V. When the $\lambda_k$'s are almost equal, this condition is nearly satisfied and the received code streams will be almost orthogonal. In the cases where this algorithm operates, this is probably acceptable because the existence of extra unused degrees of freedom in the transmitter (i.e. $N_T > N_{STC}$) leads to diversity in each of those modes that are used. Thus, the modes will have a tendency towards being equal. Hence this extra degree of tracking is not considered necessary. Also, the gradient algorithm described has the property that the resultant weight vectors tend towards the individual eigenvectors automatically, because the earlier weight vectors are given more full freedom than the later weight vectors and the dominant eigenmodes track faster; as a result, the weight vectors tend towards the dominance-ordered eigenvectors. When the received code streams are non-orthogonal, the receiver can ignore this in the processing or do equalization, analogous to time-series equalization in modems with intersymbol interference. The non-orthogonality discussed here is essentially intersymbol interference, so those algorithms apply directly with the exception of those that take advantage of time series specific properties (i.e., successful vector inputs are not independent, but rather are "shifted" in a time series).

4.3. Gradient Multi-mode Tracking

This section describes the fundamental core of the gradient feedback approach, focusing on the interoperability between the transmit unit and the receive unit. Since this must be understood by both units, it is something which must be standardized. The subsections describe some specific implementations possible by the transmit unit.

This is an extension of the single mode perturbation stochastic gradient algorithm of the '081 Application to this multi-mode case. This maximizes Eq. 21 subject to Eq. 15 as follows: the transmitting unit transmits the multiple pilots (one for each space-time code stream) with even and odd time multiplexed weight vectors, modified from the "base" tracked weight vectors by a scaled perturbation vector; the receiving unit selects which of these perturbed pilot weight sets maximizes Eq. 21 and generates feedback indicating this; the transmitter updates the weights based on this feedback, using a technique (such as a QR style orthogonalization) to maintain the condition of Eq. 15. This is trivially extended to more than two time slots and equivalent perturbed weights, with more than one feedback bit. All of the pilots are perturbed in the same manner at the same times, with different perturbation vectors. The perturbation matrix is P(i), so that:

$$t_{N_T \times 1}(i) = \begin{cases} \sqrt{P_{traffic}^{(T)}} W_{traffic}(i) s_{traffic}(i) + \\ \sqrt{P_{pilot}^{(T)}} W_{even}(i) s_{pilot}(i) & \text{if } \frac{i}{M_{slot}} \bmod 2 = 0 \\ \sqrt{P_{traffic}^{(T)}} W_{traffic}(i) s_{traffic}(i) + \\ \sqrt{P_{pilot}^{(T)}} W_{odd}(i) s_{pilot}(i) & \text{if } \frac{i}{M_{slot}} \bmod 2 = 1 \end{cases}$$ Eq. 25

The even and odd weight vector sets can be selected in many ways. The anticipated and preferred generation of these weights is by perturbation. Each individual weight vector is applied to one space-time coding stream of $s_{traffic}$, and each is individually normalized so that each space-time coding stream is transmitted with equal power.

$$W_{traffic} = \frac{W_{even} + W_{odd}}{2}$$ Eq. 26

$$W_{even} = F_{pre}(W_{base} + \beta_1 P)$$ Eq. 27

$$W_{odd} = F_{pre}(W_{base} - \beta_1 P)$$ Eq. 28

Each of the $N_{STC}$ weight vectors for traffic, even and odd time slots will also maintain the relationship of Eq. 15. The vectors $p_k$ are perturbation vectors, and can be generated in a number of ways, but preferably are constrained to:

$$E(p_k^H p_k) = N_T \quad k = 0:N_{STC} - 1$$ Eq. 29

This "expectation" can be a statistical expectation if the perturbations are generated randomly (or pseudo-randomly), or it can be the long-term average if they are generated in some clearly deterministic manner. This power constraint allows the adaptation rate to be captured in the algorithm parameters $\beta_1$ and $\beta_2$.

As in the '081 Application, the use of the normalized mean of the even and odd pilot weight vectors as the traffic weight vector (Eq. 26) allows the receiver to recover the composite channel of each of the $N_{STC}$ code streams in a simple manner as the received mean of the pilot composite channel over both the even and odd time slots. It is preferred that the pre-measurement function $F_{pre}()$ be the weight vector normalization function $N_{col}()$ so that the total transmission power is unchanged and feedback selection by the receiver is based on occupied subspace rather than transmission power, but it not an invention requirement (for reasons of computational complexity, one may decide to remove this normalization). Another alternative is to set $F_{pre}()$ to be the orthonormalization of the input, Q(), so that each tested weight set is in fact an orthonormal set; this is not necessarily desirable because by removing this constraint on the test perturbation, we generally can attain better modal separation, like what is described in section 4.2.1 above.

Figure 4:
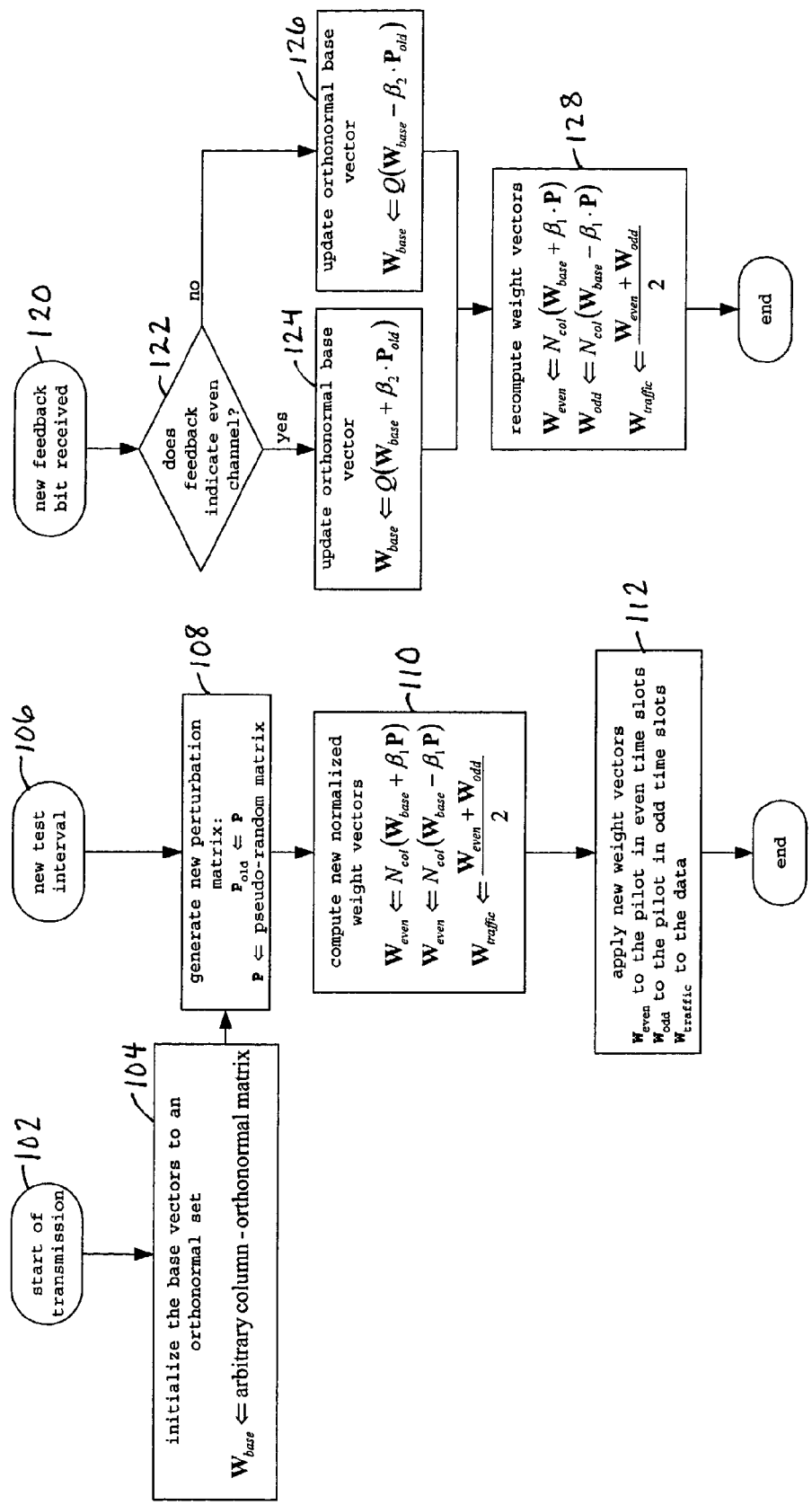
FIG. 4 is a more detailed flow diagram illustrating transmitter-side processing according to a preferred embodiment of the present invention.

As in the '081 Application, the receiver calculates which time slot, even or odd, gave the larger total received power. A feedback bit is transmitted from this receive unit to the transmit unit indicating which time slot gave the larger received power. The transmit unit then updates the base weight vector matrix $W_{base}$ to be the selected even or odd matrix, or the matrix that arises by rescaling the perturbation P by $\beta_2$, as this allows an extra degree of freedom in determining the measurement perturbation size by $\beta_1$ and the step update perturbation by $\beta_2$. This is illustrated in FIG. 4. This matrix undergoes the orthonormalization Q( ) if it was not fully performed in the even/odd probing itself. The preferred orthonormalization routine is Gramm-Schmidt, although other techniques may be used.

The set of perturbation vectors P can be generated in different ways. The most straightforward is simply that each element of P is generated as an independent complex Gaussian random variable of two-dimensional variance two (i.e., unit variance in each dimension). Some other techniques were discussed in the '081 Application, including selecting each element from the set $\{\pm 1, \pm j\}$.

Because the receiver is expected to use the time average, over even and odd slots, of the received pilot channel estimates as the channel estimate for the traffic signals, there is some channel estimation power loss from this multiplexing. In order to minimize this loss, P should be constrained to be generated only in the null space of W. That is, none of the columns of P should fall within the column space of W. In this way, none of the weight vectors will be perturbed into the space already occupied by another weight vector.

Figure 3:
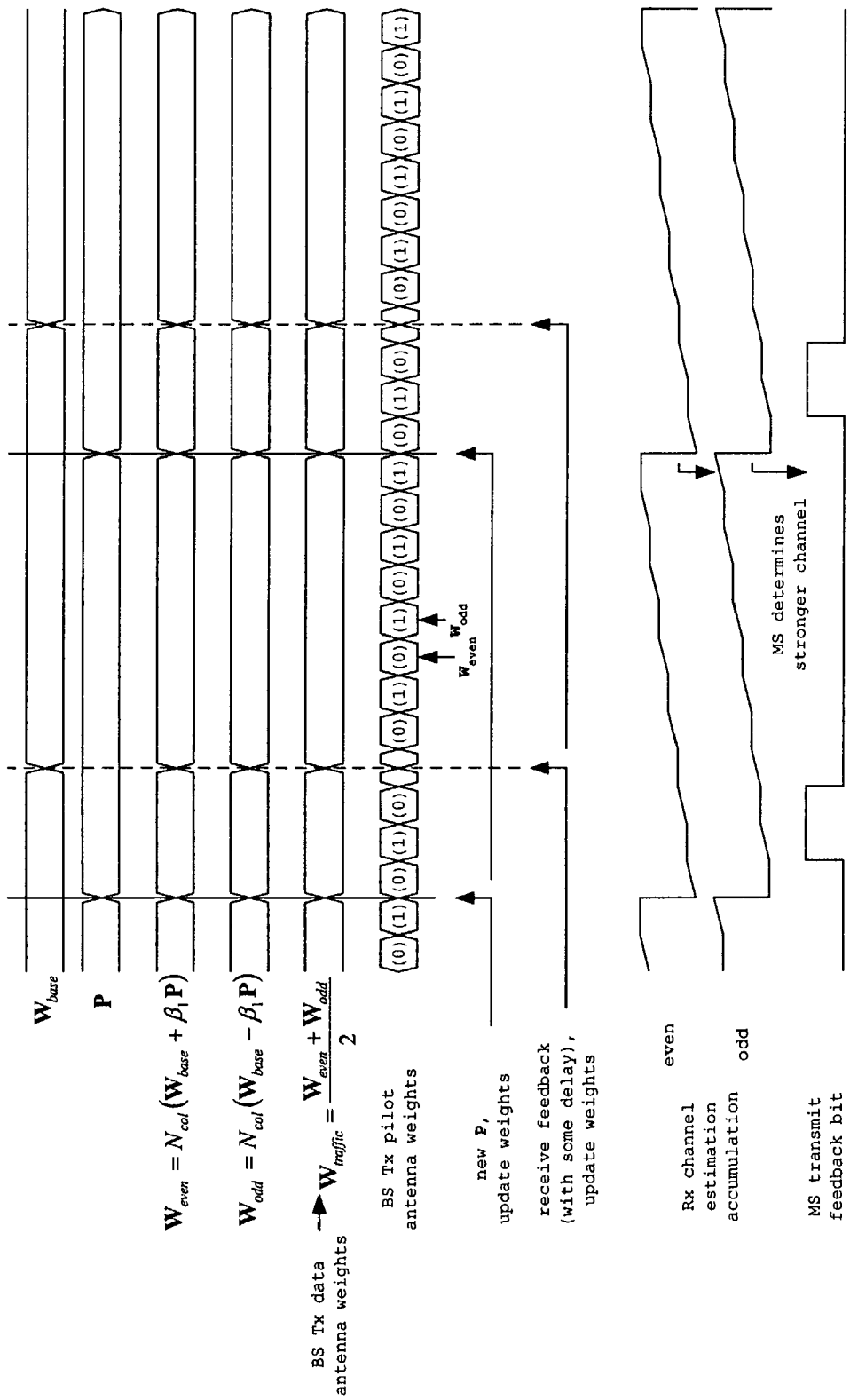
FIG. 3 illustrates a timeline for performing the signal processing according to a representative embodiment of the present invention.

In practice there is some latency in the measurement and feedback intervals, so that the transmitter receives the feedback some time after the end of the corresponding measurement interval. This is illustrated in the timeline of FIG. 3, and is reflected in the transmit-unit preferred algorithm illustrated in FIG. 4.

As shown in FIG. 4, transmission is begun in step 102.

Initially, in step 104 a base set of transmission weight vectors are generated. These weight vectors are orthonormal and may be generated arbitrarily or, alternatively, may be generated in a manner so as to approximate the best $N_{STC}$ transmission modes, e.g., by using the codebook multi-mode technique described in section 4.4 below.

Each time a new test internal is begun 106, a new perturbation matrix is generated 108. As shown in FIG. 4 and noted above, the generation of the perturbation matrix preferably is based on the current base weight vectors, i.e., such that the perturbation matrix occupies only the null space of the weighting matrix. Otherwise, the perturbation matrix may be pseudo-random.

In step 110, new even pilot, odd pilot and traffic signal weights are generated based on the perturbation matrix, as set forth in Eqs. 26-28. In the present embodiment $F_{pre}$ is set to $N_{col}$.

In step 112, the calculated weight vectors are applied to their corresponding signals.

Each time a new feedback bit is received 120, the following processing occurs.

In step 122, a determination is made as to whether the feedback bit indicates if the even or odd pilot signal channel resulted in the larger received power. If the even channel resulted in the larger power, processing proceeds to step 124. Otherwise, processing proceeds to step 126.

In step 124, a scaled version of the perturbation matrix is added to the base weighting matrix and orthonormalization is performed. In step 126, a scaled version of the perturbation matrix is subtracted from the base weighting matrix and orthonormalization is performed. By using a different scaling factor in steps 124 and 126 than is used in steps 110 and 128, an extra degree of freedom is obtained.

In step 128 the weight vectors are recomputed in the same manner described above in connection with step 110.

Figure 5:
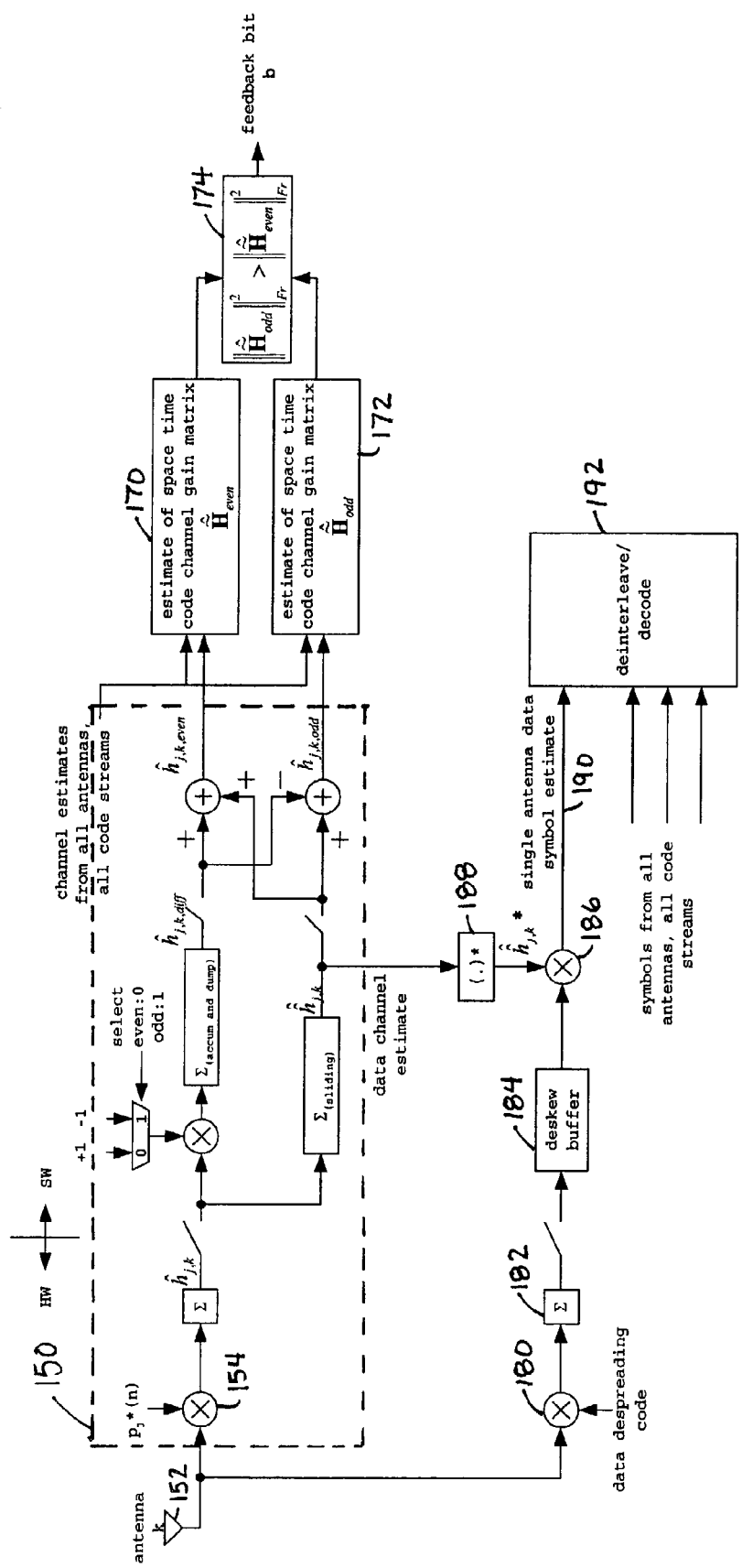
FIG. 5 is a block diagram showing receiver processing according to a representative embodiment of the present invention.

FIG. 5 illustrates a block diagram showing receiver processing according to a preferred embodiment of the invention. In FIG. 5, a path 150 is provided for each combination of receive antenna 152 (denoted with subscript k) and each data stream (denoted with subscript j). Initially, the data stream j is demultiplexed 154 and then an estimate ($\hat{h}_{j,k}$) of the STC-to-receive-antenna channel gain ($\hat{h}_{j,k}$) is generated, as well as the separate even and odd estimates. In the present embodiment, this is accomplished using the particular combination of accumulators, adders and multiplier shown in FIG. 5. However, this is merely exemplary and any other arrangement that accomplishes the same results may instead be utilized. The separate even and odd estimates are combined across all antennas k and all data streams j to provide an estimate of the even and odd space-time code channel gain matrices, in elements 170 and 172, respectively. In element 174, the squared norms of the even and odd matrices are taken and compared, and the feedback bit is generated to indicate the larger to the two.

At the same time, the signal received at antenna 152 is depsread using multiplier 180 and accumulator 182, deskewed 184, and multiplied 186 by the complex conjugate 188 of the estimate of the STC-to-receive-antenna channel gain $\hat{h}_{j,k}$, so as to obtain a singe-antenna estimate 190 of the data symbols for a single data stream. In element 192, symbol estimates are combined across all receive antennas, and deinterleaving and decoding are performed.

4.4. Codebook Multi-mode Tracking

In codebook multi-mode tracking, the weight vectors for the dedicated pilot signal are constant during a measurement interval (in contrast to the even/odd multiplexing of the gradient algorithm). In addition, there is a set of common pilots, one pilot for each transmission antenna. Using these common pilots, the receiver estimates the full channel matrix H. There is then also a codebook of possible transmission weights w which is known to both the receiver and the transmitter, as is a mapping of bits to codebook entries. The receiver then selects from this codebook the preferred transmission weights and transmits the appropriate feedback bits. The receiver selection is the weight set which best maximizes the received power, according to Eq. 21.

As an example, we can specify a codebook for a system with $N_T=4$ antennas and $N_{STC}=2$ transmission streams. The example of Eq. 30 shows the 6 possible orthogonal pairs out of a set of the 4 possible mutually orthogonal vectors, so that the feedback would be one of six values, requiring 3 bits with 2 possible bit realizations not mapping to a weight pair. The subscript on w denotes $N_T$, $N_{STC}$, and the number of codebook entries.

$$W_{(4,2,6)} = \left[ \begin{bmatrix} +1 & +1 \\ +1 & -1 \\ +1 & +1 \\ +1 & -1 \end{bmatrix} \begin{bmatrix} +1 & +1 \\ +1 & +1 \\ +1 & -1 \\ +1 & -1 \end{bmatrix} \begin{bmatrix} +1 & +1 \\ +1 & -1 \\ +1 & -1 \\ +1 & +1 \end{bmatrix} \begin{bmatrix} +1 & +1 \\ -1 & +1 \\ +1 & -1 \\ -1 & -1 \end{bmatrix} \begin{bmatrix} +1 & +1 \\ -1 & -1 \\ +1 & -1 \\ -1 & +1 \end{bmatrix} \begin{bmatrix} +1 & +1 \\ +1 & -1 \\ -1 & -1 \\ -1 & +1 \end{bmatrix} \right] \quad \text{Eq. 30}$$

It is not necessary to constrain all possible vectors to be mutually orthogonal, only each allowable set (pair for $N_{STC}=2$) of simultaneous weights is mutually orthogonal. Hence, other examples can be generated which for slow fading would give better performance. However, the number of feedback bits required grows very rapidly. The next obvious example is allowing each weight vector element to be selected from the set $\{\pm1\}$ without constraint to the 4 orthogonal vectors. With $N_T=4$, $N_{STC}=2$, this gives a total set of 12 pairs shown in Eq. 31, requiring 4-bit feedback.

$$W_{(4,2,12)} = \left[ \begin{array}{c} \begin{bmatrix} +1 & +1 \\ +1 & -1 \\ +1 & +1 \\ +1 & -1 \end{bmatrix} \begin{bmatrix} +1 & +1 \\ +1 & +1 \\ +1 & -1 \\ +1 & -1 \end{bmatrix} \begin{bmatrix} +1 & +1 \\ +1 & -1 \\ +1 & -1 \\ +1 & +1 \end{bmatrix} \begin{bmatrix} +1 & +1 \\ +1 & -1 \\ +1 & +1 \\ -1 & +1 \end{bmatrix} \begin{bmatrix} +1 & +1 \\ +1 & +1 \\ +1 & -1 \\ -1 & +1 \end{bmatrix} \begin{bmatrix} +1 & +1 \\ +1 & -1 \\ +1 & -1 \\ -1 & -1 \end{bmatrix} \\ \begin{bmatrix} +1 & +1 \\ +1 & -1 \\ -1 & -1 \\ +1 & -1 \end{bmatrix} \begin{bmatrix} +1 & +1 \\ +1 & -1 \\ -1 & +1 \\ +1 & +1 \end{bmatrix} \begin{bmatrix} +1 & +1 \\ +1 & -1 \\ -1 & -1 \\ -1 & +1 \end{bmatrix} \begin{bmatrix} +1 & +1 \\ +1 & -1 \\ -1 & +1 \\ -1 & -1 \end{bmatrix} \begin{bmatrix} +1 & +1 \\ -1 & -1 \\ +1 & -1 \\ +1 & -1 \end{bmatrix} \begin{bmatrix} +1 & +1 \\ -1 & -1 \\ +1 & -1 \\ -1 & +1 \end{bmatrix} \end{array} \right] \quad \text{Eq. 31}$$

The next step for $N_T=4$, $N_{STC}=2$ would allow $\pm1, \pm j$ for each weight, giving something more than 196 different weight vectors (exact number not known by the inventor) and requiring at least 8 feedback bits. Such a selection is deemed complicated to an undesirable degree for the receiver.

5. Advantages

One advantage of the present intention is an improvement in capacity of roughly $10\log_{10}(N_T/N_{STC})$. This can be translated to a data throughput improvement of $\log_2(N_T/N_{STC})$. Hence, with $N_T=4$ and $N_R=N_{STC}=2$, the data throughput is doubled (twice as many bits per second). This is particularly applicable to next generation systems where it can be desirable to have data rates in excess of the available spectral bandwidth. Improvements of this sort will lower the overall infrastructure cost associated with attaining some system capacity.

The perturbation gradient approach to this problem is deemed preferable to the codebook selection feedback. The implementation at the receiver is simpler, because the algorithm computes $2 \times N_R \times N_{STC}$ measurements and two decision metrics are made to compare even/odd time slots. The codebook selection, on the other hand, requires $N_R \times N_T$ raw measurements, plus generation of many metrics (6 metrics for $w_{4,2,6}$). In addition, the gradient algorithm requires the receiver to have knowledge of the number of space-time coded streams and each of the corresponding pilot signals, while the code book selection requires the receiver to have knowledge of the number of coded streams, each corresponding pilot signal, plus the number of transmit antennas and a pilot for each antenna. Hence, the complexity of the interoperability is much greater and the flexibility of the network is reduced for codebook selection relative to perturbation gradient.

6. Certain Novel Aspects of the Invention

The following list identifies certain novel aspects of the present invention:

1. Negotiating (between transmit unit and receive unit) the number of active STC modes which will be used, $N_{STC}$. This should conform to $N_{STC} \leq \min(N_T, N_R)$, and must conform to $N_{STC} \leq N_T$.
2. Determining through channel measurements at the receiver the number of active modes, which may be less than $\min(N_T, N_R)$, to use for $N_{STC}$.
3. Mode tracking in a space-time coding algorithm where the number of transmit antennas is greater than the number of receive antennas. That is, the concept of mode tracking itself is believed to be new.
4. STC mode tracking using receive-unit to transmit-unit feedback.
5. A mode tracking algorithm using the stochastic gradient techniques previously developed for multiple-input single-output (MISO) systems in the '081, '925, '751 and '728 Applications. Specifically, the perturbation probing (especially where the data transmit weight is the mean of the perturbed weights to allow easy channel recovery) and feedback mechanism which requires interoperability between the receive unit and the transmit unit.

7. Possible Modifications to the Invention

The channel coding scheme is not specified above. While the coding scheme is important, the present invention is directed to a signal-processing algorithm that generally can be executed independently of the coding scheme used. Possible coding schemes include convolutional or Turbo coding. For data applications, high-performance, large-block-length codes like Turbo codes generally will be more preferable.

Channel interleaving is part of the channel coding, and again is not specified above and generally is not directly relevant to the techniques of the present invention.

The decoding scheme is not specified. This can be performed in many ways, and generally is somewhat independent from the tracking signal-processing algorithm described.

Other specific mode-tracking algorithms could be implemented. Variations on existing MISO feedback approaches could be done for the MIMO case.

Different "startup" algorithms could be run for fast convergence, where the initial even/odd weight matrix of the perturbation stochastic gradient algorithm is generated in some manner other than perturbation to allow fast convergence. In the steady state, the perturbation approach is believed to give better performance, based on simulation results for the single-mode algorithm of the '081 Application. This variation applies equally to the previously described algorithms of the '081, '925, '751 and '728 Applications.

8. System Environment

As indicated above, many of the methods and techniques described herein can be implemented at a base station in a wireless (e.g., cellular) communications system. The functionality described herein can be implemented using special-purpose hardware components or can be implemented with a general-purpose computer system. It will be appreciated that some of the components illustrated in the accompanying figures are standard components and can be constructed using known techniques.

A general-purpose computer for implementing techniques of the present invention typically will include, for example, at least some of the following components: one or more central processing units (CPUs), read-only memory (ROM), random access memory (RAM), input/output circuitry for interfacing with other devices and for connecting to one or more networks (which in turn may connect to the Internet or to any other networks), a display (such as a cathode ray tube or liquid crystal display), other output devices (such as a speaker or printer), one or more input devices (such as a mouse or other pointing device, keyboard, microphone or scanner), a mass storage unit (such as a hard disk drive), a real-time clock, a removable storage read/write device (such as for reading from and/or writing to a magnetic disk, a magnetic tape, an optomagnetic disk, an optical disk, or the like), and a modem (which also may connect to the Internet or to any other computer network via a dial-up connection). In operation, the process steps to implement the above methods typically are initially stored in mass storage (e.g., the hard disk), are downloaded into RAM and then executed by the CPU out of RAM.

Suitable hardware for use in implementing the present invention may be obtained from various vendors. Various types of hardware may be used depending upon the size and complexity of the tasks. Suitable general-purpose computers include mainframe computers, multiprocessor computers, workstations, personal computers, and even smaller computers such as PDAs, wireless telephones or any other networked appliance or device.

Any of the functionality described above can be implemented in software, hardware, firmware or any combination of these, with the particular implementation being selected based on known engineering tradeoffs.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

9. Additional Considerations

The descriptions of the above embodiments refer to a transmitter and receiver, reflecting the flow of data for the traffic channel of interest in the implementation of present invention. However, it should be understood that the "transmitter" will also receive data and the "receiver" will also transmit data, both in connection with the transmission of feedback data and, typically, in connection with one or more reverse traffic channels.

In addition, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for use in wireless communication between a transmitter having plural transmit antennas and a receiver having plural receive antennas, said method comprising:
   (a) simultaneously transmitting to the receiver a first data stream using a first transmit antenna weight vector and a second data stream using a second transmit antenna weight vector;
   (b) transmitting to the receiver a first perturbation signal corresponding to the first transmit antenna weight vector and a second perturbation signal corresponding to the second transmit antenna weight vector;
   (c) receiving from the receiver feedback regarding the first transmit antenna weight vector and the second transmit antenna weight vector; and
   (d) utilizing the feedback to modify the first transmit antenna weight vector and the second transmit antenna weight vector,
   wherein at least two weights in the first transmit antenna weight vector and at least two weights in the second transit antenna weight vector are non-zero.

2. A method according to claim 1, wherein the first perturbation signal comprises a pilot signal transmitted using a first perturbation of the first transmit antenna weight vector.

3. A method according to claim 2, further comprising a step of transmitting the pilot signal using a second perturbation of the first transmit antenna weight vector.

4. A method according to claim 3, wherein the second perturbation is 180° out of phase with the first perturbation.

5. A method according to claim 3, wherein the first perturbation is time multiplexed with the second perturbation.

6. A method according to claim 1, wherein the first perturbation signal comprises a pilot signal transmitted using a perturbation vector, and wherein in step (d) the perturbation vector is added to the first transmit antenna weight vector depending upon the first feedback.

7. A method according to claim 1, wherein the first feedback indicates a direction in which to perturb the first transmit antenna weight vector.

8. A method according to claim 1, wherein in step (d) each of the first and second transmit antenna weight vectors is perturbed using a perturbation vector that is orthogonal to both the first and second transmit antenna weight vectors.

9. A method according to claim 1, wherein a separate pilot channel is transmitted for each of the first and second data streams.

10. A method according to claim 1, wherein the first transmit antenna weight vector is at least approximately orthogonal to the second transmit antenna weight vector.

11. A method for use in wireless communication between a transmitter having plural transmit antennas and a receiver having plural receive antennas, said method comprising:
(a) receiving plural input signals, one input signal from each receive antenna;
(b) decoding from each input signal plural pilot signals, one pilot signal corresponding to each of plural data stream signals;
(c) estimating a modified channel gain matrix based on the pilot signals decoded in step (b), wherein the modified channel gain matrix reflects actual channel gains between the transmitter and the receiver and any transmit antenna weight vector, which has at least two non-zero weights, applied by the transmitter; and
(d) using the modified channel gain matrix to obtain the plural data stream signals,
wherein the pilot signal is transmitted using a perturbation vector, which is added to the transmit antenna weight vector depending upon a feedback from the receiver.

12. A method according to claim 11, further comprising steps of separating the pilot signals into different components, generating feedback based upon a comparison of the different components, and transmitting the feedback to the transmitter.

13. A method according to claim 12, wherein the feedback is generated by determining which component of the pilot signals resulted in greater total received power.

14. A method according to claim 12, wherein the feedback is generated based on a comparison of the different components across all receive antennas and all data stream signals.

15. A method according to claim 12, wherein the different components are time-multiplexed in the pilot signals.

16. A method according to claim 11, wherein step (d) comprises multiplying the input signals by a complex conjugate transpose of the modified channel gain matrix.

17. A method according to claim 11, further comprising a step of communicating with the transmitter to establish a number of data stream signals to be communicated.

18. A method for use in wireless communication between a transmitter having plural transmit antennas and a receiver having plural receive antennas, said method comprising:
(a) receiving plural input signals, one input signal from each receive antenna;
(b) decoding from each input signal plural pilot signals, one pilot signal corresponding to each of the plural transmit antennas at the transmitter;
(c) estimating a channel gain matrix based on the pilot signals decoded in step (b), wherein the channel gain matrix reflects channel gains between the transmitter and the receiver;
(d) selecting a set of transmit antenna weight vectors, each of which has at least two non-zero weights, for simultaneously transmitting plural data stream signals based on the channel gain matrix; and
(e) transmitting information to identify the set of transmit antenna weight vectors to the transmitter,
wherein the pilot signal is transmitted using a perturbation vector, which is added to the transmit antenna weight vector depending upon a feedback from the receiver.

19. A method according to claim 18, wherein the information transmitted in step (e) comprises a code to select the set of transmit antenna weight vectors from a group of predefined sets.

20. A method according to claim 18, wherein all vectors in the set of transmit antenna weight vectors are mutually orthogonal.

21. A method according to claim 18, wherein the set of transmit antenna weight vectors is selected so as to maximize total power of the plural data stream signals, subject to other constraints.

22. An apparatus for use in wireless communication between a transmitter having plural transmit antennas and a receiver having plural receive antennas, said apparatus comprising:
(a) means for simultaneously transmitting to the receiver a first data stream using a first transmit antenna weight vector and a second data stream using a second transmit antenna weight vector;
(b) means for transmitting a first perturbation signal corresponding to the first transmit antenna weight vector and a second perturbation signal corresponding to the second transmit antenna weight vector;
(c) means for receiving from the receiver feedback regarding the first transmit antenna weight vector and the second transmit antenna weight vectors; and
(d) means for utilizing the feedback to modify the first transmit antenna weight vector and the second transmit antenna weight vector,
wherein at least two weights in the first transmit antenna weight vector and at least two wights in the second transmit antenna weight vector are non-zero.

23. An apparatus for use in wireless communication between a transmitter having plural transmit antennas and a receiver having plural receive antennas, said apparatus comprising:
(a) means for receiving plural input signals, one input signal from each receive antenna;
(b) means for decoding from each input signal plural pilot signals, one pilot signal corresponding to each of the plural data stream signals;
(c) means for estimating a modified channel gain matrix based on the pilot signals decoded by said means (b), wherein the modified channel gain matrix reflects actual channel gains between the transmitter and the receiver and any transmit antenna weight factor, which has at least two non-zero weights, applied by the transmitter; and (d) means for using the modified channel gain matrix to obtain the plural data stream signals, wherein the pilot signal is transmitted using a perturbation vector, which is added to the transmit antenna weight vector depending upon a feedback from the receiver.

24. An apparatus for use in wireless communication between a transmitter having plural transmit antennas and a receiver having plural receive antennas, said apparatus comprising:

(a) means for receiving plural input signals, one input signal from each receive antenna;

(b) means for decoding from each input signal plural pilot signals, one pilot signal corresponding to each of the plural transmit antennas at the transmitter;

(c) means for estimating a channel gain matrix based on the pilot signals decoded by said means (b), wherein the channel gain matrix reflects channel gains between the transmitter and the receiver;

(d) means for selecting a set of transmit antenna weight vectors, each of which has at least two non-zero weights, for simultaneously transmitting plural data stream signals based on the channel gain matrix; and (e) means for transmitting information to identify the set of transmit antenna weight vectors to the transmitter, wherein the pilot signal is transmitted using a perturbation vector, which is added to the transmit antenna weight vector depending upon a feedback from the receiver.

* * * * *